United States Patent [19]

Schnapp

[11] 4,343,186
[45] Aug. 10, 1982

[54] VIBRATION PICKUP

[75] Inventor: Herbert Schnapp, Muelldorf, Fed. Rep. of Germany

[73] Assignee: Interatom Internationale Atomreaktorbau GmbH, Bergisch Gladbach, Fed. Rep. of Germany

[21] Appl. No.: 192,516

[22] PCT Filed: Apr. 19, 1979

[86] PCT No.: PCT/EP79/00026
§ 371 Date: Feb. 28, 1980
§ 102(e) Date: Feb. 28, 1980

[87] PCT Pub. No.: WO80/00187
PCT Pub. Date: Feb. 7, 1980

[30] Foreign Application Priority Data
Jun. 29, 1978 [DE] Fed. Rep. of Germany ....... 2828541

[51] Int. Cl.$^3$ ............................................. G01H 1/04
[52] U.S. Cl. ........................................ 73/649; 73/493
[58] Field of Search ................. 73/493, 649, 652, 654, 73/660, 661; 176/19 R

[56] References Cited
U.S. PATENT DOCUMENTS
3,225,294 12/1965 McClung et al. ................... 324/220
3,859,847 1/1975 Ronemus ............................... 73/660

Primary Examiner—James J. Gill
Attorney, Agent, or Firm—Herbert L. Lerner; Laurence A. Greenberg

[57] ABSTRACT

Device for performing vibration measurement of parts, having at least one measuring instrument making contact with a measuring point under spring load, and a manipulating device operatively associated with the measuring instrument for bringing the latter to the measuring point including means for retracting the measuring instrument into the manipulating device while the measuring instrument is brought to the measuring point by the manipulating device, the measuring instrument being detachable from the manipulating device, except for yieldable connections, during vibration measurement at the measurement point, the measuring instrument having means for firmly fixing the position thereof at the measuring point.

4 Claims, 3 Drawing Figures

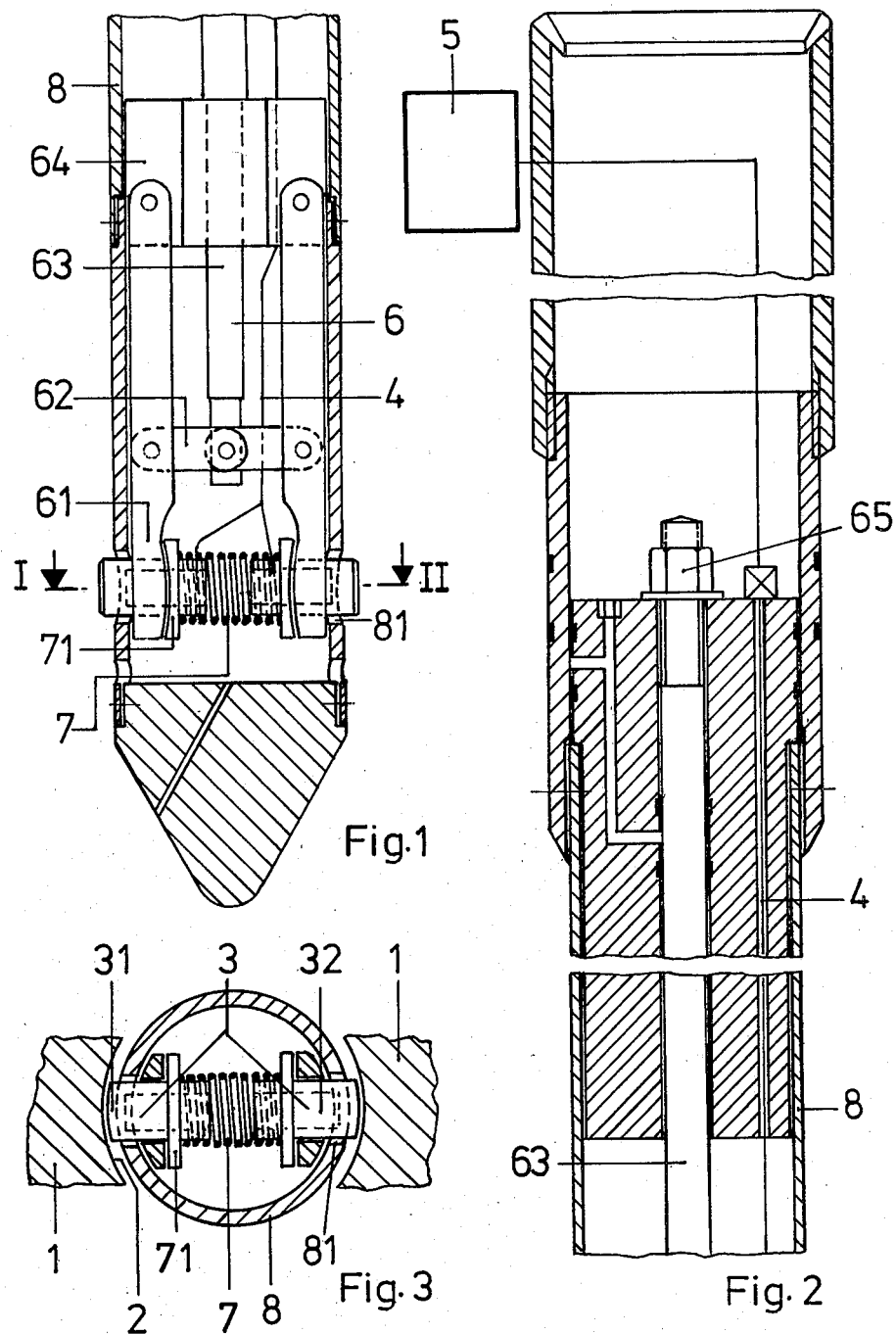

VIBRATION PICKUP

The present invention relates to a remotely controllable vibration pickup according to the preamble of claim 1, which is suitable particularly for use in inaccessible places. Thus, to demonstrate the operating safety of nuclear reactors, vibration measurements, among other things, must be performed at a number of points, for instance, at the coolant feed- and discharge pipes, which, while they must be made before the startup and therefore without radiation exposure, then nevertheless with the installation completely assembled. The measuring points which are chosen for the measurements and are prepared for instance, by making suitable contact surfaces for the measuring devices available, are often accessible only by means of so-called instrumentation lances, in the head of which the measuring devices are arranged and which are brought through suitable canals, gaps or the like. The application of the invention, however, is not limited to this use, which is described here as an example.

The result of the vibration measurement on a part is naturally falsified by the fact that the vibration properties of the part are influenced by the measuring device resting against it itself. This detrimental influence can be made negligibly small by keeping the mass of the measuring device small as compared to that of the part; this, however, presents difficulties if the mass of the manipulator, i.e., the instrumentation lance, must be included in the former.

It is an object of the present invention to describe a remotely controllable device for vibration measurement which can be positioned securely and the co-vibrating mass of which is kept as small as possible. Thereby, the spring force required to provide the contact pressure for the measuring device at high frequencies is kept very small.

This problem is solved by the means proposed in the feature part of claim 1. "Non-rigid connections" or yieldable connections are understood here to mean primarily cables for the power supply to the measuring devices and the conveyance of the measurement data obtained to indicating devices, memories etc., which, in order to keep the co-vibrating mass of the measuring device small, are arranged separate from the latter. This mass is reduced to an absolute minimum by the provision that the manipulator device is decoupled vibration-wise from the measuring device proper for the duration of the measurement.

An embodiment of this idea of the invention is proposed in the second claim. Securing the measuring devices at the measuring point by means of spring force is the most advantageous solution with respect to assembling and disassembling them as well as with respect to the means required for the auxiliary devices to be provided at the part. If the pickup device is braced with one measuring device each against different parts, the latter can be measured in one operation.

The means proposed in the third claim serve to make the assembly and disassembly of the measuring devices at the point of measurement realizable for remote control.

It is particularly useful to combine two or more measuring devices in one device and have them braced against opposite portions of the same part if, as is proposed in the 4th claim, the individual measuring devices are arranged for picking up vibrations in different directions, for instance, with three devices in the X-, Y- and Z-direction.

An embodiment example of the invention is shown in the drawing, where

FIG. 1 shows the lower portion and

FIG. 2, the upper portion of an axial longitudinal section, and

FIG. 3, a cross section according to the line I–II.

In some part 1, the vibration behavior of which is to be investigated but which is not shown in detail, a cylindrical canal 2, for instance, is arranged, into which an appropriate measuring device or instrument can be inserted, as shown here. This device consists of two measuring instruments 3, each consisting of a clamping member 31 and the accelerometer proper 32, which is arranged in the former. The accelerometer is connected via a cable 4 to an indicating device 5 installed at an accessible location, for instance, an oscilloscope (only indicated schematically here). Into the canal 2, which is located at an otherwise inaccessible location, are brought the measuring devices 3 by means of a tubular instrumentation lance 8 of considerable length which is provided, transversely to its longituninal axis, with two openings 81, through which the clamping members 31 can protrude outward beyond the outline of the instrumentation lance 8 and, as shown here, are mutually tensioned, braced against opposite sides of the canal 2, in such a manner that the measuring devices 3 remain in their position also without further fastening if their connection to the instrumentation lance is detached. This is accomplished through the force of a coil spring 7 which is braced on the inside against abutments 71 which are formed at each clamping member 31. Since the cable 4 is not rigid, a vibration measurement at the part 1 is influenced only by the additional mass of the two measuring devices 3 and the spring 7. One of the measuring devices can pick up vibrations, for instance, in the radial direction and the other, in the axial direction, relative to the canal 2.

When the measurement is completed and the measuring devices 3 are to be removed from the canal 2, the spring 7 is compressed by means of a tensioning device 6 so far that the clamping members 31 get loose and may even retract into the instrumentation lance 8. The tensioning device 6 consists in detail of two claws 61 which push against the abutments 71 from the outside and are linked to a flange 64 in the interior of the instrumentation lance 8; also linked to the claws 61 is a lever 62 which is linked at its other end to a pull rod 63 which is brought upward in the instrumentation lance 8. At the upper end, this rod is provided with a thread, on which an adjusting nut can be turned; if it is turned, for instance, clockwise, the pull rod is pulled up and the levers 62 are deflected in such a manner that they push the claws 61 against the abutments 71 and thus compress the spring 7.

I claim:

1. Device for performing vibration measurement of parts, having at least one measuring instrument making contact with a measuring point under spring load, and a manipulating device operatively associated with the measuring instrument for bringing the latter to the measuring point comprising means for retracting the measuring instrument into the manipulating device while the measuring instrument is brought to the measuring point by the manipulating device, the measuring instrument being detachable from the manipulating device, except for yieldable connections, during vibration measurement at the measurement point, the measuring instrument having means for firmly fixing the position thereof at the measuring point.

2. Vibration measurement device according to claim 1 comprising at least two parts, and said means for firmly fixing the position of the measuring instrument comprising spring means for forcing said two parts apart and bracing said two parts against opposite locations of a part to be measured.

3. Vibration measurement device according to claim 2 wherein the manipulating device comprises means for cocking said spring means.

4. Vibration measurement device according to claim 2 or 3, including at least two of the measuring instruments disposed so as to measure vibrations in different directions, respectively.

* * * * *